US011582442B1

(12) United States Patent
Fehervari et al.

(10) Patent No.: US 11,582,442 B1
(45) Date of Patent: Feb. 14, 2023

(54) VIDEO ENCODING MODE SELECTION BY A HIERARCHY OF MACHINE LEARNING MODELS

(71) Applicant: Amazon Technologies, Inc., Seattle, WA (US)

(72) Inventors: Istvan Fehervari, North Vancouver (CA); Ramzi Khsib, Coquitlam (CA); Amirhessam Moltaji, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 17/111,387

(22) Filed: Dec. 3, 2020

(51) Int. Cl.
*H04N 11/02* (2006.01)
*H04N 19/103* (2014.01)
*H04N 21/2187* (2011.01)
*G06N 20/00* (2019.01)
*H04N 19/42* (2014.01)
*H04N 19/136* (2014.01)
*H04N 19/176* (2014.01)

(52) U.S. Cl.
CPC ........... *H04N 19/103* (2014.11); *G06N 20/00* (2019.01); *H04N 19/136* (2014.11); *H04N 19/176* (2014.11); *H04N 19/42* (2014.11); *H04N 21/2187* (2013.01)

(58) Field of Classification Search
CPC .................................................... H04N 19/103
USPC ........................................ 375/240.01–240.29
See application file for complete search history.

(56) References Cited

U.S. PATENT DOCUMENTS

| | | | | |
|---|---|---|---|---|
| 2003/0215011 | A1* | 11/2003 | Wang | H04N 19/40 375/E7.14 |
| 2004/0052507 | A1* | 3/2004 | Kondo | H04N 19/43 375/E7.199 |
| 2007/0206674 | A1* | 9/2007 | Ziauddin | H04N 19/61 375/E7.181 |
| 2009/0185626 | A1* | 7/2009 | Seupel | G06F 16/739 375/E7.021 |
| 2013/0034149 | A1* | 2/2013 | Karuchula | H04N 19/124 375/240.03 |
| 2013/0058405 | A1* | 3/2013 | Zhao | H04N 19/166 375/E7.243 |
| 2018/0139450 | A1* | 5/2018 | Gao | H04N 19/147 |
| 2019/0045195 | A1* | 2/2019 | Gokhale | H04N 19/119 |
| 2019/0075301 | A1* | 3/2019 | Chou | H04N 19/132 |
| 2019/0132591 | A1* | 5/2019 | Zhang | G06N 3/10 |
| 2020/0092552 | A1* | 3/2020 | Coelho | H04N 19/147 |
| 2020/0186809 | A1* | 6/2020 | Mukherjee | G06T 9/002 |

* cited by examiner

*Primary Examiner* — Leron Beck
(74) *Attorney, Agent, or Firm* — Nicholson De Vos Webster & Elliott LLP

(57) ABSTRACT

Techniques for training and using machine learning models for video encoding mode selection are described. According to some embodiments, a computer-implemented method includes receiving a live video at a content delivery service, extracting one or more features for a plurality of macroblocks of a frame of the live video, determining an encoding mode from a plurality of encoding modes for each of the plurality of macroblocks of the frame with a machine learning model based at least in part on an input of the one or more features, performing a real time encode of the frame of the live video based at least in part on the determined encoding modes to generate an encoded frame by the content delivery service, and transmitting the encoded frame from the content delivery service to a viewer device.

21 Claims, 14 Drawing Sheets

VIDEO ENCODING MODE SELECTION BY A HIERARCHY OF MACHINE LEARNING MODELS

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

DETAILED DESCRIPTION

The present disclosure relates to methods, apparatus, systems, and non-transitory computer-readable storage media for video encoding mode selection by one or more machine learning models. In certain embodiments, the selection of a particular encoding mode from a plurality of candidate encoding modes is a crucial decision to be made for encoding (e.g., compression) of video, for example, with the majority (e.g., about 80-90%) of the encoding time spent on the operations for that selection. Embodiments herein use one or more machine learning models to select an encoding mode (e.g., with different encoding modes selectable for each macroblock of a frame) for a video encoder, e.g., an encoding mode according to a video encoding standard. In one embodiment, the video encoding standard is an Advanced Video Coding (AVC) standard, for example, a H.264 standard. Certain embodiments herein utilize a hierarchy of levels of machine learning models to perform a machine learning driven mode determination to predictively select one or more encoding modes (e.g., and a mode partition size) for an input video (e.g., each single macroblock thereof). Embodiments herein thus reduce the computation cost of an (e.g., AVC standard) encoding mode decision. Embodiments herein utilize one or more machine learning models to select the optimal encoding mode(s) for real time live video encoding (e.g., and/or transcoding) applications.

Figure 1:
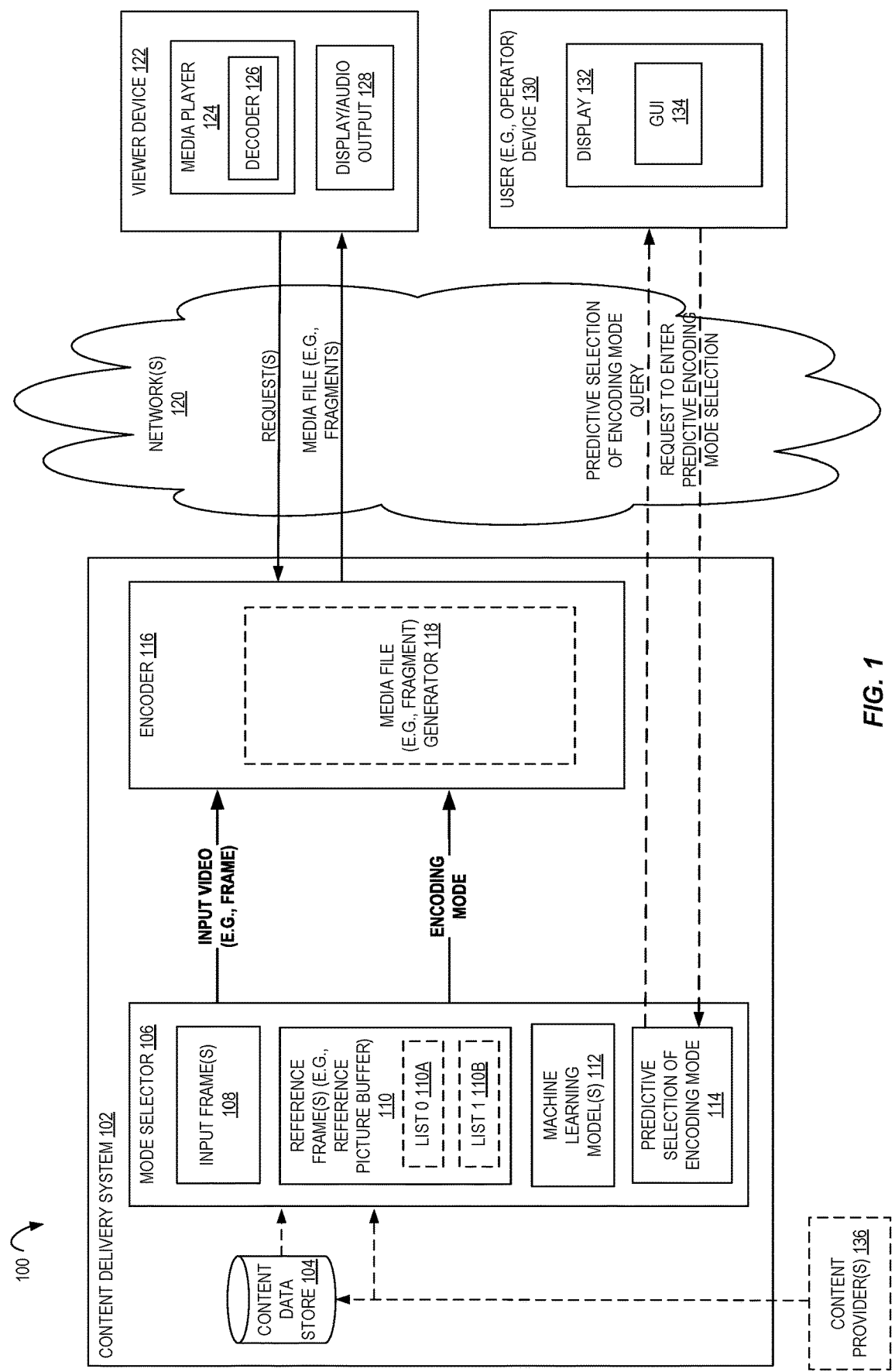
FIG. 1 is a diagram illustrating an environment including a content delivery system, having a mode selector utilizing one or more machine learning models to predictively select one or more encoding modes and an encoder to encode a media file according to the one or more encoding modes, to send the encoded media file to a viewer device according to some embodiments.

FIG. 1 is a diagram illustrating an environment 100 including a content delivery system 102, having a mode selector 106 utilizing one or more machine learning models 112 to predictively select one or more encoding modes 114 and an encoder 116 to encode a media file (e.g., "input video") according to the one or more encoding modes, to send the encoded media file to a viewer device 122 according to some embodiments. In certain embodiments, video compression (e.g., of a content delivery system/service) includes an encoding mode for certain proper subset(s) of the input video. An encoding mode may be in accordance with a video encoding standard.

Encoding may compress a video file (e.g., input frame(s) 108) into a plurality of compressed frames, for example, one or more intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and the preceding and/or following frames (in video order) to specify its content). For example, with P-frames and B-frames being inter-coded pictures. In one embodiment, each single I-frame is followed by a plurality of inter-coded frames (e.g., P-frames and/or B-frames), e.g., as a group of pictures (GOP). In certain embodiments, an encoder selects one or more prediction styles for a slice (e.g., a sequence of macroblocks), for example, a switching I (SI) frame (e.g., slice) that facilitates switching between coded streams (e.g., containing SI-macroblocks as a special type of intra coded macroblock) and/or a switching P (SP) frame (e.g., slice) that facilitates switching between coded streams (e.g., containing P and/or I-macroblocks).

An encoding algorithm (e.g., specified by a video encoding standard) may select between inter coding and intra coding for (e.g., block-shaped) regions of each picture (e.g., frame 108). In certain embodiments, inter coding (e.g., as indicated by an "inter" mode) uses motion vectors for (e.g., block-based) inter prediction from other pictures (e.g., frames) to exploit temporal statistical dependencies between different pictures. The reference pictures (e.g., reference frames) 110 may be stored in a reference picture buffer. In certain embodiments, intra coding (e.g., as indicated by an "intra" mode) uses various spatial predictions to exploit spatial statistical dependencies in the source signal for a single picture (e.g., frame). In certain embodiments, motion vectors and intra prediction modes are specified for a variety of block sizes in the picture. In certain embodiments, the prediction residual is then further compressed using a transform to remove spatial correlation inside the transform block before it is quantized, producing an irreversible process that typically discards less important visual information while forming a close approximation to the source samples. In certain embodiments, the motion vectors or intra prediction modes are combined with the quantized transform coefficient information and encoded, e.g., using either variable length coding or arithmetic coding.

An encoding mode (e.g., to be used to encode a particular macroblock of a frame) may include one, all, or any combination of the following: direct mode, inter mode, or intra mode. A direct mode may cause encoding with an inter prediction for a block for which no motion vector is decoded. Examples of two direct prediction modes are spatial direct prediction mode and temporal prediction mode.

In certain embodiments, a mode has one or more sub-modes that are to be specified. In same embodiments, the same (e.g., prediction) mode is used for corresponding chroma (component) and luminance (component) blocks.

For example, a direct mode may include a skip mode (e.g., sub-mode) and/or a B-frame (e.g., B-slice) direct mode (e.g., sub-mode). In one embodiment, skip mode is for P-frames (e.g., P-slices), for example, where the (e.g., spatial direct prediction) motion is derived directly from previously encoded information (e.g., thus not having to encode any additional motion data for a macroblock). In one embodiment, direct mode is for B-frames (e.g., B-slices), for example, where the (e.g., temporal prediction) motion is derived directly from previously encoded information (e.g., thus not having to encode any additional motion data for a macroblock). Previously encoded information may be stored in a reference picture buffer 110, for example, List 0 references 110A being a reference picture list used for inter prediction of a P, B, or SP slice (e.g., block). In certain embodiments, inter prediction used for P and SP slices uses (reference picture) list 0 110A. For bi-predictive (e.g., before or after the current frame in video order), a certain (e.g., DIRECT) mode may utilize two motion vectors pointing to different references. In certain embodiments, inter prediction used for B slices uses (reference picture) list 0 110A and (reference picture) list 1 110B.

For example, an inter mode (e.g., sub-mode) may include a (e.g., luminance) block partition size, e.g., 16×16, 16×8, 8×16, or 8×8 (pixels×pixels). An inter mode may use a transform, e.g., a 4×4 transform or 8×8 transform.

For example, an intra mode (e.g., sub-mode) may include a (e.g., luminance) block partition size, e.g., intra4×4, intra8×8 and intra16×16. For example, intra4×4 may include further prediction sub-modes of vertical, horizontal, DC, diagonal-down-left, diagonal-down-right, vertical-right, horizontal-down, vertical-left, and/or horizontal-up.

An encoding mode may be used to encode a particular slice of a frame, e.g., where a slice is a spatially distinct region of a frame that is encoded separately from any other region in the same frame and/or where a slice is a plurality of macroblocks (e.g., a sequence of macroblock pairs). A macroblock may be encoded as a single unit by an encoder.

An "encoding mode" may be separate from encoder settings, e.g., separate from values setting one, all, or any combination of the following encoder settings in an encoder: spatial adaptive quantization strength, temporal adaptive quantization strength, flicker reduction, dynamic group-of-pictures (GOP) on/off, number of B-frames (e.g., per GOP), prefilter on/off, delta quantization parameter (QP) offsets (e.g., between I-frame and P-frames/B-frames), rate distortion optimization quantization (RDOQ), speed settings, or additional configuration (e.g., encoder) settings.

In certain embodiments (e.g., at the start of the video encoding process) a content delivery system/service is to select the encoding modes, e.g., one mode for each macroblock (or slice) of a frame. This may include a mode selection that is to select a (e.g., optimal from a visual quality perspective) single mode by looping through all the available modes by encoding according to a mode then decoding and measuring the quality between the media (e.g., macroblock) that was encoded versus the decoded version. However, such iterative (e.g., trial and error) operations are costly in terms of computation as they are a brute-force approach. Additionally or alternatively to such iterative operations, embodiments herein utilize one or more machine learning models for video encoding mode selection.

In certain embodiments, mode selector 106 (e.g., service and/or system) includes a field, that when set, causes predictive selection of an encoding mode 114. In one embodiment, storing a first value into field for "predictive selection of an encoding mode" 114 causes the mode selector to determine an encoding mode with one or more machine learning models 112, e.g., and storing a second, different value into field for "predictive selection of an encoding mode" 114 causes the mode selector 106 to not determine an encoding mode with one or more machine learning models 112 (for example, to instead determine the encoding mode with iterative operations, e.g., as discussed in reference to FIG. 4 below). In one embodiment, the one or more machine learning models 112 are selected for use in a live (e.g., and video-on-demand) application.

The depicted content delivery system 102 includes a content data store 104, which may be implemented in one or more data centers. In one embodiment, the media file (e.g., video file that is to be viewed by the viewer device 122) is accessed (for example, from the content data store 104 or directly from a content provider 136, e.g., as a live stream)

by encoder 116 (e.g., by media file (e.g., fragment) generator 118). In certain embodiments, the (e.g., client) viewer device 122 requesting the media file (e.g., fragment(s) of media) from content delivery system 102 causes the encoder 116 to encode the video file, e.g., into a compressed format for transmittal on network(s) 110 to viewer device 122. In one embodiment, the media file generator 118 generates one or more subsets (e.g., frames, fragments, segments, scenes, etc.) of the media file (e.g., video), e.g., beginning with accessing the media file and generating the requested media (e.g., fragment(s)). In one embodiment, each fragment includes a plurality of video frames.

It may be desirable to allow mode selector 106 to generate encoding mode for encoder 116, e.g., without user device 130 or viewer device 122 inputting the encoding mode. Content delivery system 102 includes mode selector 106. Depicted mode selector 106 uses one or more machine learning models 112 to infer (e.g., optimal) encoding modes, e.g., for each block (e.g., macroblock) or slice of an input video (e.g., from dotted path on the left of FIG. 1). Training and use of machine learning model(s) 112 are discussed further below, e.g., in reference to FIGS. 3-9.

In FIG. 1, content delivery system 102 is coupled to viewer device 122 and user device 130 via one or more networks 120, e.g., a cellular data network or a wired or wireless local area network (WLAN).

In certain embodiments, content delivery system 102 (e.g., mode selector 106 thereof) is to send a query (e.g., asking if the predictive selection of encoding mode is desired) to user (e.g., operator) device 130, for example, and the user device 130 (e.g., in response to a command from a user of the device 130) is to send a response (e.g., an indication to enter or not enter "predictive selection of an encoding mode" 114). Depicted user device 130 includes a display 132 having a graphical user interface (GUI) 134, e.g., to display a query for mode selector 106 to enter (or not enter) "predictive selection of an encoding mode" 114 mode.

Depicted viewer device 122 (e.g., where the viewer is a customer of user (e.g., operator) of device 130) includes a media player 124 having a decoder 126 to decode the media file (e.g., fragment) from the content delivery system 102, e.g., to display video and/or audio of the media file on display and/or audio output 128, respectively.

In certain embodiments, mode selector 106 in "predictive selection of an encoding mode" 114 uses machine learning model(s) 112 (and/or is a machine learning powered service) that automatically determines one or more of the encoding modes.

In certain embodiments, the encoding modes generated by mode selector 106 in "predictive selection of an encoding mode" 114 (e.g., using machine learning model(s) 112 thereof) are provided to the encoder 116 and used to encode the input (e.g., live) video. The input video is shown as being provided from mode selector 106, but it should be understood that the input video may be provided directly to encoder 116, for example, from (e.g., live) content provider 136.

Figure 2:
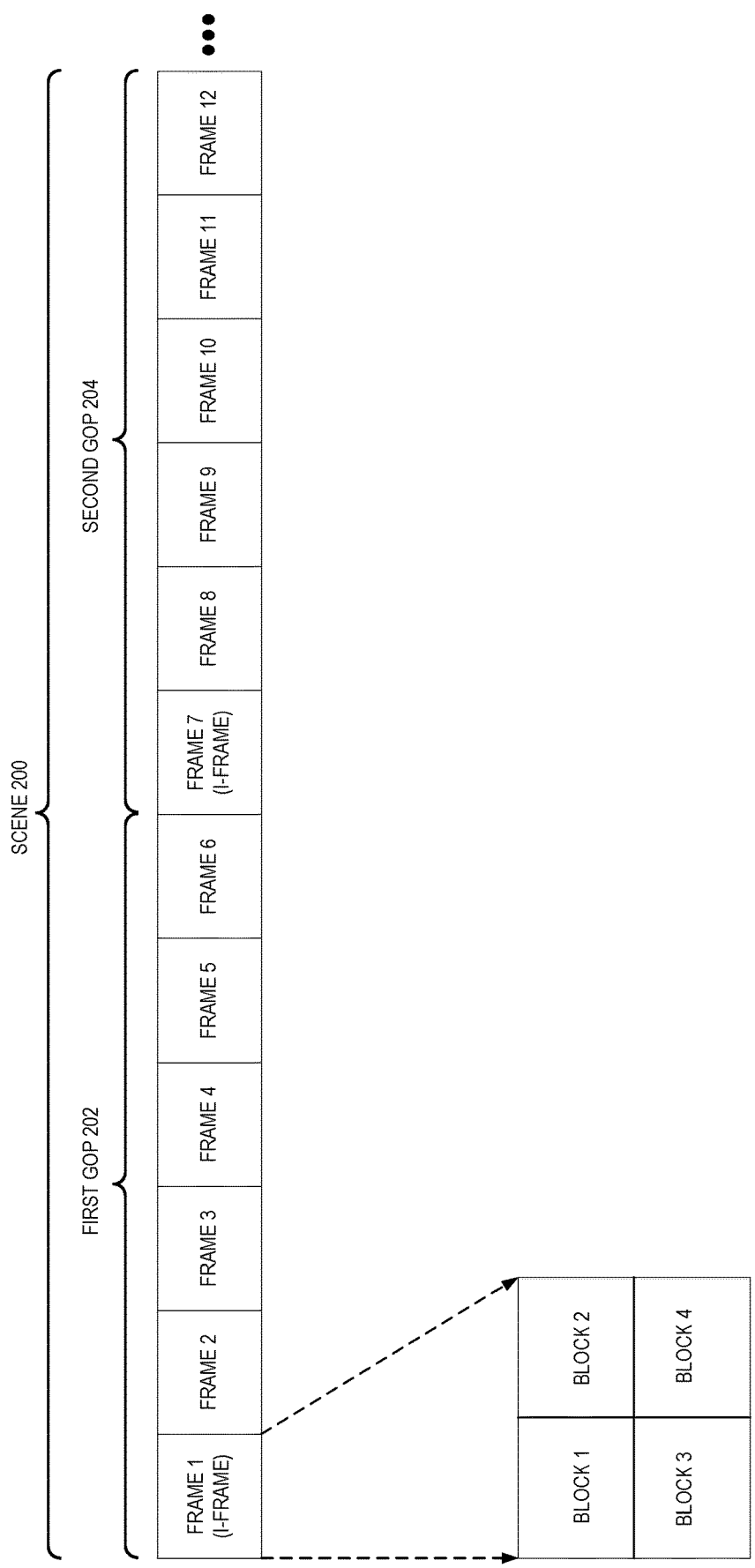
FIG. 2 is a diagram illustrating a scene having a plurality of groups of pictures, and a frame formed from a plurality of blocks (e.g., macroblocks) according to some embodiments.

FIG. 2 is a diagram illustrating a scene 200 having a plurality of groups of pictures 202, 204, and a frame (frame 1) formed from a plurality of blocks (blocks 1-4) (e.g., macroblocks) according to some embodiments. The number of scenes, GOPs (frames therein), and blocks are merely examples, e.g., it should be understood that any number of scenes, GOPs (frames therein), and blocks may be utilized.

In some embodiments, a macroblock is a proper subset of pixels of a frame used as the basic processing unit of the video encoding/decoding. An example macroblock is a (e.g., 8×8, 16×16, 64×64, 128×128, 256×256, or other size) block, e.g., a block of luma samples and two corresponding blocks of chroma samples. A macroblock can be a square, rectangle, or other shape. A macroblock can be further partitioned for inter prediction. In one embodiment, the selection of the size of inter prediction partitions (e.g., as an encoding mode) is a result of a trade-off between the coding gain provided by using motion compensation with smaller blocks and the quantity of data needed to represent the data for motion compensation. The inter prediction process can form segmentations for motion representation that as smaller than a macroblock, e.g., as small as 4×4 luma samples in size, using motion vector accuracy of one-quarter of the luma sample grid spacing displacement. The process for inter prediction of a sample block can also involve the selection of the picture to be used as the reference picture from a number of stored previously-decoded pictures (e.g., reference frame(s) 110 in FIG. 1)). In certain embodiments, motion vectors are encoded differentially with respect to predicted values formed from nearby encoded motion vectors. In one embodiment, an encoder calculates appropriate motion vectors and other data elements represented in the video data stream. This motion estimation process in the encoder and/or the selection of whether to use inter prediction for the representation of each region of the video content may be specified by an encoding standard.

Figure 3:
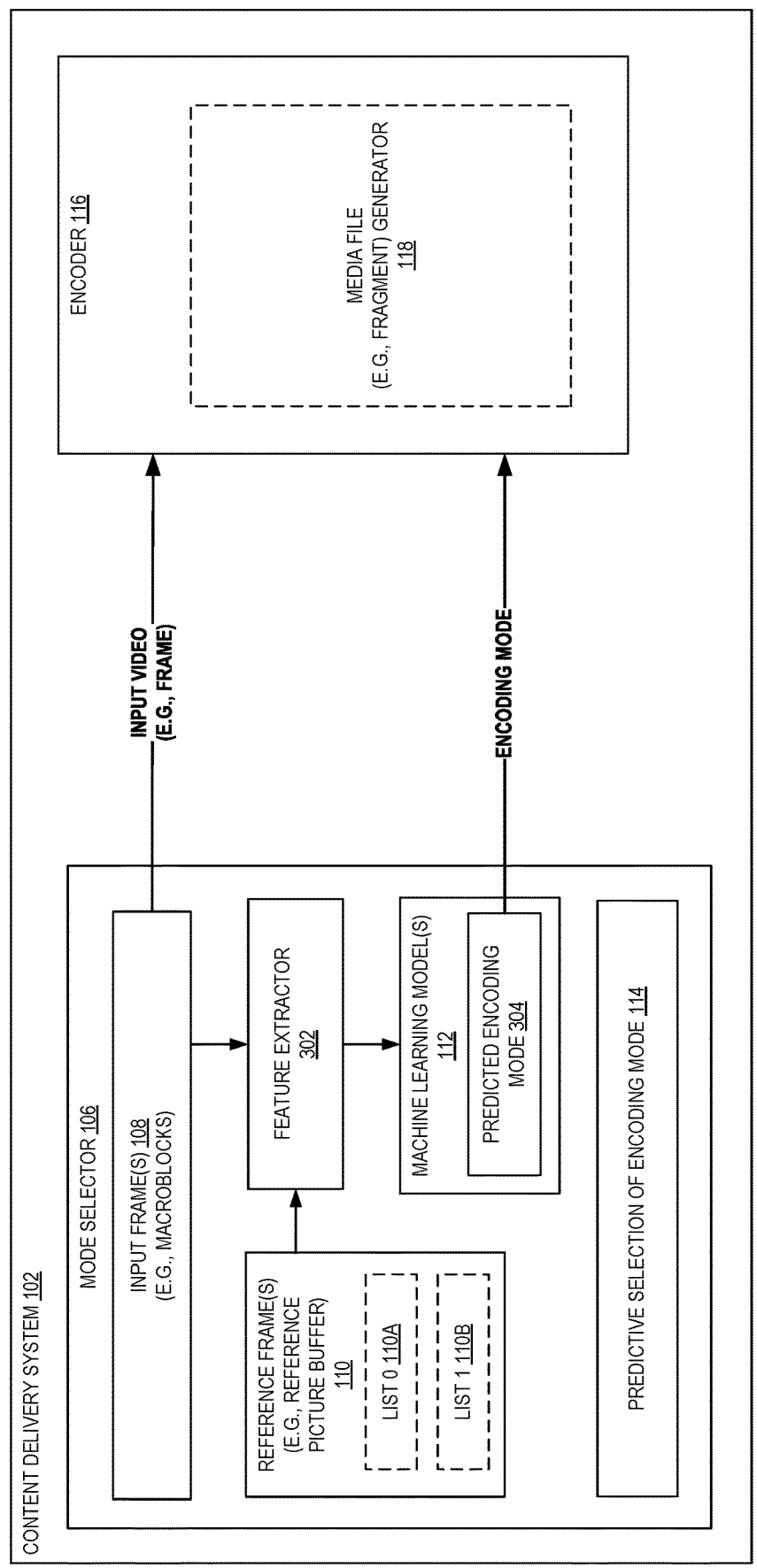
FIG. 3 is a diagram illustrating a content delivery system having a mode selector utilizing one or more machine learning models to predictively select one or more encoding modes for an input frame according to some embodiments.

FIG. 3 is a diagram illustrating a content delivery system 102 having a mode selector 106 utilizing one or more machine learning models 112 to predictively select one or more encoding modes 304 for an input frame 108 according to some embodiments. In certain embodiments, mode selector 106 set in the "predictive selection of an encoding mode" 114 uses machine learning model(s) 112 (and/or is a machine learning powered service) to automatically determine one or more of the encoding modes 304. In one embodiment, feature extractor 302 is to extract one or more features (e.g., forming a feature vector therefrom) from input frame 108, e.g., the particular macroblock being input into machine learning model(s) 112. Feature extractor 302 may extract one or more features from reference frame(s) 110, e.g., including data from list 0 110A and/or list 1 110B. In one embodiment, a mode selection is made for each macroblock (e.g., or each slice of macroblocks) of input frame 108. Feature extractor 302 may extract one or more motion features, luminance (e.g., luma) features, chrominance (e.g., chroma) features, encoding mode(s) used in a previous frame(s), and/or encoding mode(s) used for other (e.g., neighboring) blocks or slices in the current frame. Machine learning model(s) 112 may take as input one or more macroblock statistics.

In certain embodiments, the encoding mode(s) 304 generated by mode selector 106 in "predictive selection of an encoding mode" 114 (e.g., using machine learning model(s) 112 thereof) are provided to the encoder 116 and used to encode the input (e.g., live) video.

In certain embodiments, the machine learning model(s) 112 is a classifier model, e.g., where each mode (or submode) is a class. In certain embodiments, the machine learning models 112 are a hierarchy of machine learning models (e.g., as discussed below in reference to FIG. 5).

In one embodiment, machine learning model(s) 112 is a bootstrapped aggregated trees model with random forests, e.g., with a set of trees in the ensemble that can be fine-tuned on-the-fly to obtain lower bias and thus overfit on the video at hand. In one embodiment, a machine learning model 112 is to scale up and/or down depending on the trade-off quality speed. For example, where random forest decisions are the aggregate decisions of weak learners (e.g., individual decision trees trained on a subset of features), the number of weak learners used in the aggregation can be adjusted in certain embodiments, for example, such that a larger number of trees yields better quality (e.g., lower variance on unseen videos) at the cost of additional computational overhead. In one embodiment, machine learning model(s) 112 is selected to have a relatively small computational overhead, e.g., smaller than a Support Vector machines (SVM) Model or a deep neural network (DNN) model (although either of those models may be used as a machine learning model 112 in other embodiments).

In certain embodiments, the encoding modes are heavily skewed depending on the frame type. This imbalance in data makes the training and predictive capability difficult in certain embodiments. To solve this issue, embodiments herein utilize a custom misclassification function where the classification error on the minority class is heavily penalized compared to the majority class, adjust minority classes by adding a prior probability, and/or differentially weigh samples to give more importance to the sample where the error has larger impact on quality.

In one embodiment, perceptual driven models for mode decision are computationally intensive and not suitable for live encoder (and even in video-on-demand encoding, the cost of such models may be prohibitive, e.g., owing to the numerous floating-point operations, single value decompositions, etc.). Certain embodiments herein utilize offline training, e.g., to train the models to select perceptually optimal models.

Figure 4:
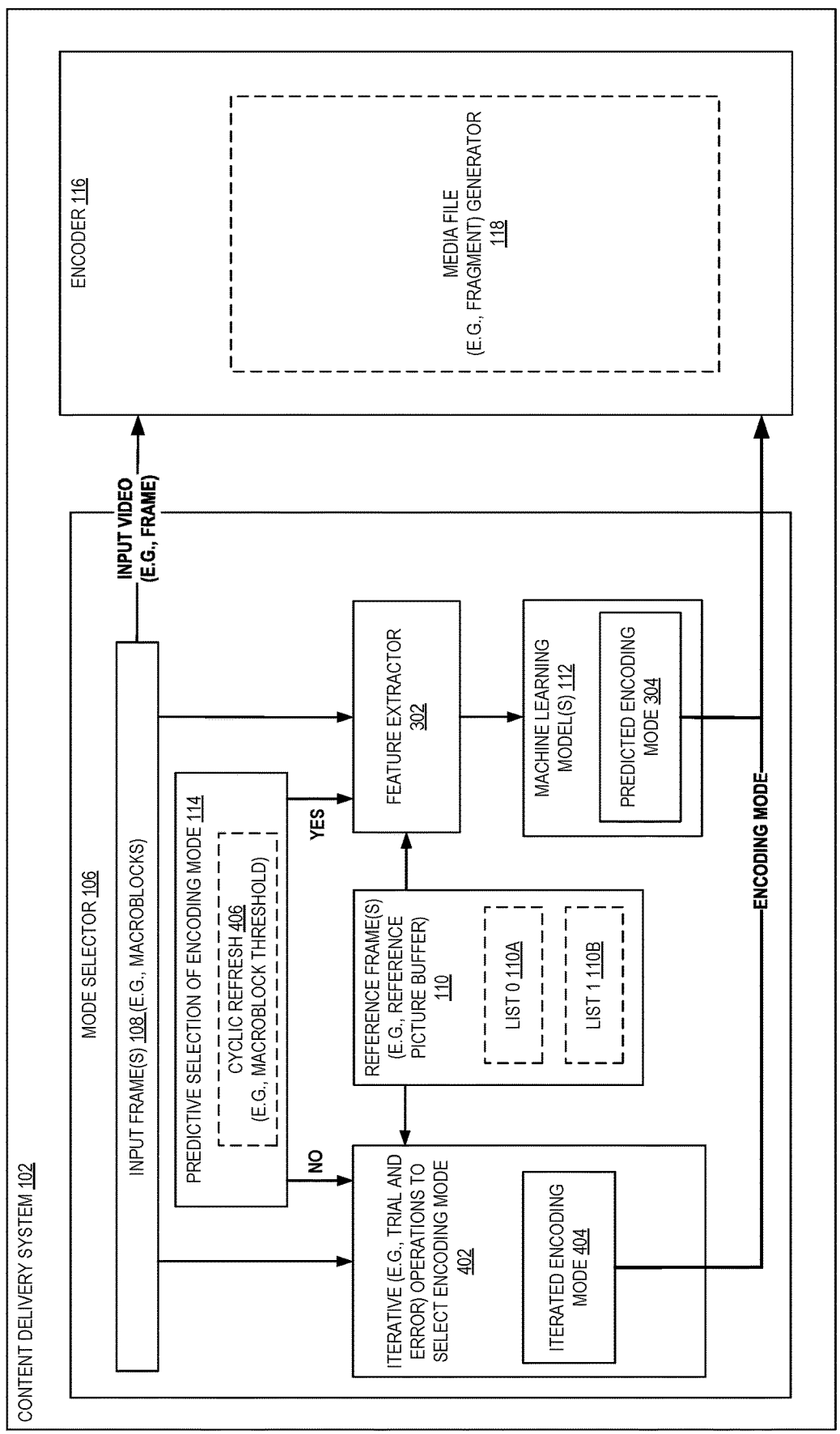
FIG. 4 is a diagram illustrating a content delivery system having a mode selector switchable between a first configuration that performs iterative (e.g., trial and error) operations to select one or more encoding modes for an input frame and a second configuration to use one or more machine learning models to predictively select one or more encoding modes for the input frame according to some embodiments.

FIG. 4 is a diagram illustrating a content delivery system 102 having a mode selector 106 switchable between a first configuration that performs iterative (e.g., trial and error) operations 402 to select one or more encoding modes 404 for an input frame 108 and a second configuration to use one or more machine learning models 112 to predictively select one or more encoding modes 304 for the input frame 108 according to some embodiments. In certain embodiments, mode selector 106 set in the "predictive selection of an encoding mode" 114 uses machine learning model(s) 112 (and/or is a machine learning powered service) to automatically determine one or more of the encoding modes 304. In one embodiment, feature extractor 302 is to extract one or more features (e.g., forming a feature vector therefrom) from input frame 108, e.g., the particular macroblock being input into machine learning model(s) 112. Feature extractor 302 may extract one or more features from reference frame(s) 110, e.g., including data from list 0 110A and/or list 1 110B. In one embodiment, a mode selection is made for each macroblock (e.g., or each slice of macroblocks) of input frame 108. Feature extractor 302 may extract one or more motion features, luminance (e.g., luma) features, chrominance (e.g., chroma) features, encoding mode(s) used in a previous frame(s), and/or encoding mode(s) used for other (e.g., neighboring) blocks or slices in the current frame. Machine learning model(s) 112 may take as input one or more macroblock statistics.

In certain embodiments, mode selector 106 not set in the "predictive selection of an encoding mode" 114 performs iterative (e.g., trial and error) operations 402 to iteratively determine one or more of the encoding modes 404.

In certain embodiments, the encoding mode(s) 304 generated by mode selector 106 in "predictive selection of an encoding mode" 114 (e.g., using machine learning model(s) 112 thereof) are provided to the encoder 116 and used to encode the input (e.g., live) video and/or the encoding mode(s) 404 generated by mode selector 106 when not in "predictive selection of an encoding mode" 114 (e.g., not using machine learning model(s) 112 thereof) are provided to the encoder 116 and instead used to encode the input (e.g., live) video.

Certain machine learning models overfit on their training data and thus can have accuracy issues when the distribution of other (e.g., test) data differs from the training data. In the video encoding domain such ill-predictions could have catastrophic effects (e.g., very low visual quality). Certain embodiments herein do not rely on a machine learning model's predicted mode for each macroblock or slice (e.g., each macroblock/slice of a same frame). Certain embodiments herein allow for the fine tuning of a machine learning model (e.g., on the fly) to the video at hand. Certain modes may utilize data from a neighboring block, e.g., in determining a current mode for a current block (e.g., macroblock) based on information (e.g., encoding mode) of one or more adjacent (e.g., neighboring) blocks (e.g., macroblocks) of that same frame. This may cause propagation of an (e.g., incorrect or undesirable) prediction of an encoding mode for a block to other blocks (e.g., with the block and the other blocks being in a same, single frame). For example, where a current block mode is tied to its neighbors it may thus present a risk of error propagation. To break this chain of propagation, a (e.g., cyclic) refresh 406 is used in certain embodiments. In one embodiment, when a threshold number (e.g., N, where N is an integer) of macroblocks (or slices, frames, GOPs, scenes, etc.) have been processed by machine learning model 112(s) (e.g., and have a predicted encoding mode 304), certain action(s) can be taken. The action(s) may include switching to processing a block (or slice) via iterative operations 402 to determine an iterated encoding mode 404 (e.g., or selectively outputting encoding mode 404 instead of predicted encoding mode 304 to encoder 116 for that block). The action(s) may include tuning (e.g., re-training) the machine learning model(s) 112, for example, and revert to iterative operations 402 (e.g., while one or more (e.g., every) encoding mode and/or model is tested). In one embodiment, cyclic refresh 406 is set to switch to iterative operations 402, e.g., to switch away from "predictive selection of encoding mode" 114 even when it is set to occur.

In certain embodiments, the cyclic refresh 406 is set to detect a new scene of the input video, and use a first one or more frames of the scene as a gauge on how frequent the cyclic refresh, e.g., comparing the accuracy of the predicted mode versus the actual optimal mode for the first one or more frames. In one embodiment, for the subsequent frames, the cyclic refresh 406 is defined by the estimated model accuracy, e.g., if the accuracy is low, more blocks have their encoding mode determined by the iterative operations 402. The error between predicted and measured performance may be used to fine-tune the machine learning model(s), e.g., while they are deployed. Another approach for refresh (e.g., retraining machine learning model(s) 112) is to measure the probability of the decision. In one embodiment, a machine learning model(s) 112 returns its prediction (e.g., predicted encoding mode 304) with a probability (e.g., between 0 and 1) associated with it. In certain embodiments, a higher probability indicates a higher confidence level around that decision, and when a threshold is reached, it may cause a refresh (e.g., retraining of machine learning model(s) 112).

In certain embodiments, mode selector 106 loops (e.g., individually) through all blocks (or slices, or other granularity) inside a current frame and selects the optimal encoding mode(s) 304, for example, optimal according to an (e.g., Lagrange) optimization with rate and/or quality).

To find the optimal quality, an iterative (e.g., brute force) operations method may try every single combination of mode, prediction type (e.g., inter or intra), partition size, etc. However, in some embodiments the number of combinations to be tested is monumental and the computation overload is considerable. Embodiments herein reduce the number of searches while retaining quality. Certain heuristics (e.g., early skip modes) may be used to eliminate the most improbable modes, e.g. where the number of intra modes in B-frames is typically low (e.g., in nominal condition and content) so extensive searches can be avoided for intra modes in B-frames in certain embodiments. In one embodiment, an advanced statistical model uses a motion homogeneity measure to skip the search of sub partitions mode, e.g., to reduce computation.

Figure 5:
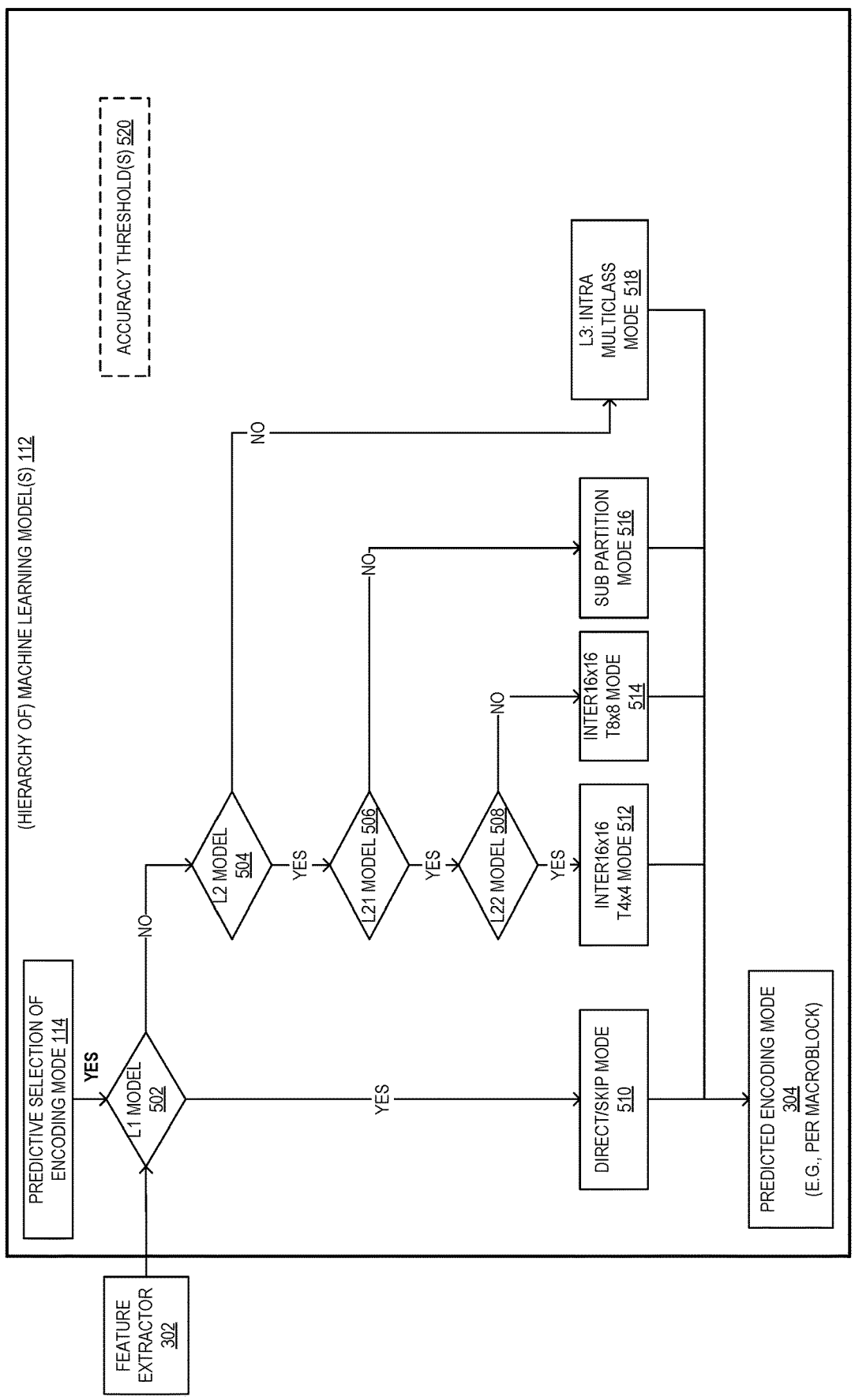
FIG. 5 is a diagram illustrating a hierarchy of machine learning models to predictively select one or more encoding modes for an input frame (e.g., a single macroblock thereof) according to some embodiments.

FIG. 5 is a diagram illustrating a hierarchy of machine learning models 112 to predictively select one or more encoding modes 304 for an input frame (e.g., a single macroblock thereof) according to some embodiments. In certain embodiments, mode selector 106 set in the "predictive selection of an encoding mode" 114 uses machine learning model(s) 112 (and/or is a machine learning powered service) to automatically determine one or more of the encoding modes 304, e.g., from the feature(s) extracted by feature extractor 302. In one embodiment, each diamond in FIG. 5 is a machine learning model. In certain embodiments, the output of each machine learning model (e.g., an inference along with its corresponding probability), is compared to a corresponding accuracy threshold 520 for the decision to take one of the plurality of output paths, e.g., for each level of the hierarchy of machine learning models 112. For example, a first level (L1) model 502 outputting a mode from one of its outputs for "yes" (e.g., the probability for that mode from the L1 model exceeding a corresponding accuracy threshold 520) and outputting the data for the input frame (e.g., macroblock thereof) to a next, second level (L2) model 504 for "no" (e.g., the probability for that mode from L1 model not exceeding a corresponding accuracy threshold 520). This may be completed for multiple levels, e.g., and sub levels such as L2 sub level 1 (L21 model 506) and L2 sub level 2 (L22 model 508). A third or more level may also be utilized.

In certain embodiments, the mode decision paradigm is modeled as a hierarchical classification problem where the predictive model at each level determines the optimal encoding mode (e.g., and partition size) from a set of defined modes. This allows faster operation already due to its depth-first tree expansion approach.

An example hierarchy of machine learning models 112 is to, for an input of a macroblock (e.g., the features for that macroblock) are input into first level (L1) model 502 (e.g., binary classifier model) trained to output a (e.g., binary) output of (i) direct mode (e.g., or skip mode) 510 as predicted encoding mode 304 for that macroblock (e.g., when the probability for that mode from the L1 model exceeds a corresponding accuracy threshold 520) or (ii) no direct mode, e.g., which causes the input of the macroblock (e.g., the features for that macroblock) to be input into second level (L2) model 504 (e.g., binary classifier model) trained to output a (e.g., binary) output of (i) inter mode (e.g., and output that as predicted encoding mode 304 for that macroblock or forward to further sub-mode model(s)) (e.g., when the probability for that mode from the L2 model exceeds a corresponding accuracy threshold 520) or (ii) intra mode 518 (e.g., not inter mode) as predicted encoding mode 304 for that macroblock. In one embodiment, skip mode 510 is output from model 502 in response to the input macroblock being a P-frame (e.g., P-slice) and/or direct mode 510 is output from model 502 in response to the input macroblock being a B-frame (e.g., B-slice), e.g., as a sub-level of first level (L11) model.

In FIG. 5, the inter mode path (e.g., "yes" from L2 model 504) is to go to sub-level(s) of level 2, e.g., with first sub-level of second level (L21) model 506 (e.g., binary classifier model) trained to output a (e.g., binary) output of (i) a (e.g., entire) macroblock size (e.g., 16×16) for encoding, e.g., which causes the input of the macroblock (e.g., the features for that macroblock) to be input into second sub-level of second level (L21) model 508 or (ii) a sub-partition mode 516, e.g., where the macroblock is split into further partitions for encoding (e.g., 16×8, 8×16, or 8×8 block partition size). In one embodiment, second sub-level of second level (L22) model 508 (e.g., multi-class classifier model) is trained to output a (e.g., multi-class) output of (i) a first size of transform (e.g., 4×4) mode 512 as predicted inter encoding mode 304 for that macroblock (e.g., when the probability for that mode from the L22 model exceeds a corresponding accuracy threshold 520) or (ii) a second, different size of transform (e.g., 8×8) mode 514 as predicted inter encoding mode 304 for that macroblock (e.g., when the probability for that mode from the L22 model does not exceed a corresponding accuracy threshold 520).

In certain embodiments, each level (e.g., L1, L2, L3, etc.) of hierarchy of machine learning models 112 operates in series (e.g., causal) fashion, for example, if the L1 model 502 flags a current macroblock as (e.g., highly) likely (e.g., the probability for that mode from the model exceeds a corresponding accuracy threshold 520) to be a direct mode 510, the other levels (e.g., L2, L3, etc.) are skipped, e.g., saving the computation cycles to infer inter and/or intra modes. In one embodiment, each level (e.g., L1, L2, L3, etc.) of hierarchy of machine learning models 112 that is traversed (e.g., in series) adds extra computation time (e.g., cycles). To lessen such overhead, certain embodiments herein utilize the ranking of the frequency of encoding modes, e.g., as determined before using the hierarchy of machine learning models 112 separate from training. In certain embodiments, the ordering of the machine learning models of the hierarchy of machine learning models 112 into levels (e.g., L1, L2, L3, etc.) is by decreasing probability of having a particular mode, for example, with direct mode predicting model as L1 model 502 where direct mode occurs more frequently than inter mode and intra mode, and/or inter mode predicting model as L2 model 504 where inter mode occurs more frequently than intra mode. For example, where such ordering reduces the total computation of the hierarchy of machine learning models 112 (e.g., reducing the number of times there is a computation of L1, L2, and L3 decisions for a single macroblock).

Certain embodiments herein utilize hierarchy of machine learning models 112 to the optimal mode (e.g., and mode partition size) and thus reduce the computational cost of a (e.g., H.264/AVC) mode decision while maintaining an imperceptible quality loss. Certain embodiments herein utilize hierarchy of multiple levels of independent classifiers to determine at each level (e.g., or sub-level) the optimal mode to use to encode a block (e.g., within a (e.g., H.264/AVC) main encoding loop). Certain embodiments herein provide a failsafe design toggle (e.g., as discussed in reference to FIG. 4) between a predictive and an iterative solution for cyclic refresh and error propagation refresh. Certain embodiments here utilize training data that includes the accumulated knowledge and content from customer content based on iterations of video quality optimization. Certain embodiments herein perform a multi metric optimization. Certain embodiments herein reduce iterative operations and replace them with (e.g., faster) machine learning inferences to determine encoding mode(s), e.g., where the iterative operations previously consumed the majority of the computing time of an encoding process. Certain embodiments herein reduce and/or eliminate catastrophic risk, for example, where selection from a defined set of modes eliminates the catastrophic failure scenario (e.g., selecting the "wrong" (e.g., less optimal) mode) leads to a reduced quality at most, and with cyclic refresh the impact may be reduced to a local region).

Figure 6:
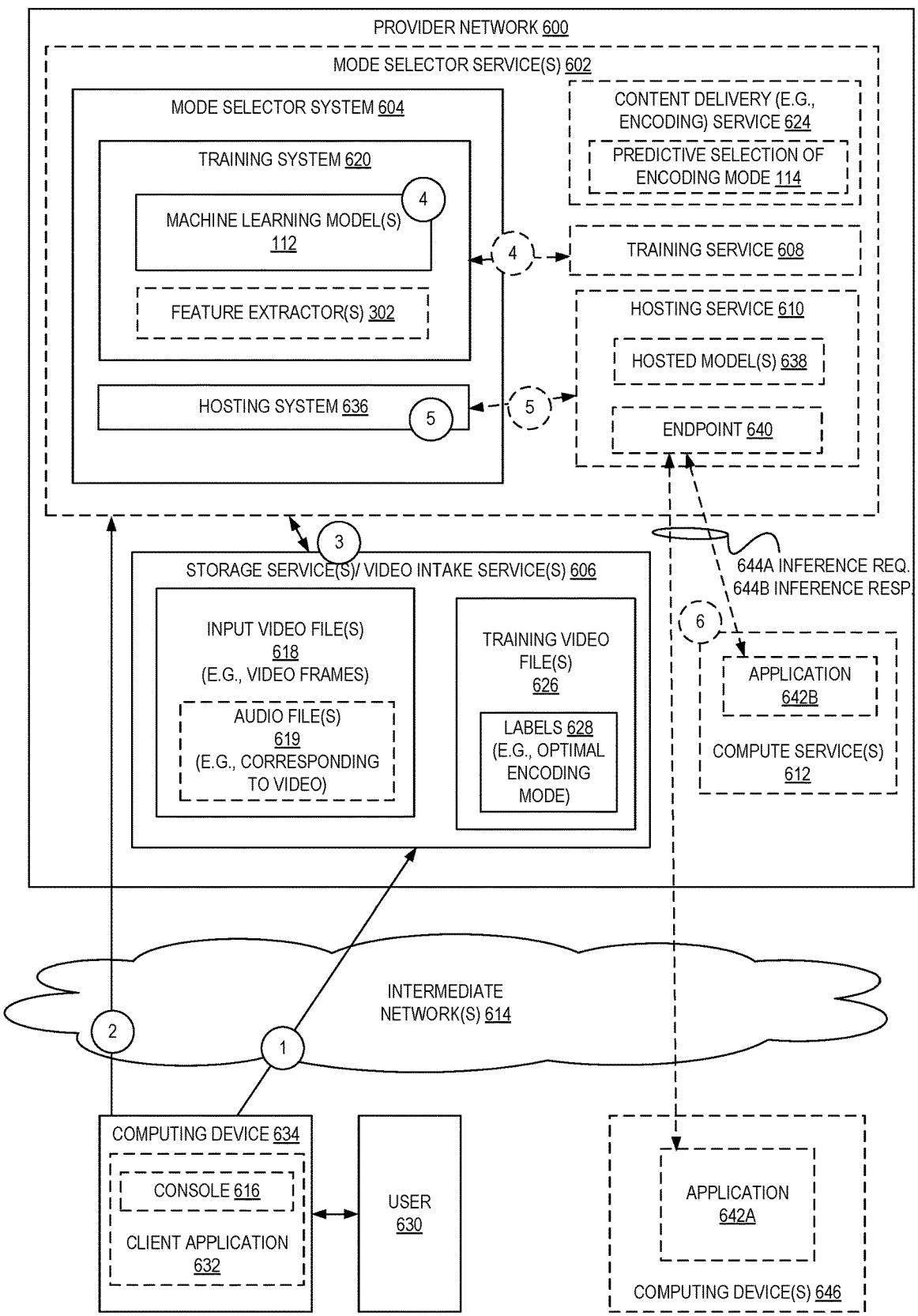
FIG. 6 is a diagram illustrating an environment for creating, training, and using models of a mode selector service according to some embodiments.

FIG. 6 is a diagram illustrating an environment for creating, training, and using models of a mode selector service 602 according to some embodiments. FIG. 6 includes a mode selector system 604, one or more storage/video intake services 606, one or more training services 608, one or more hosting services 610, one or more compute services 612, and one or more content delivery services 624 implemented within a multi-tenant provider network 600. Each of the mode selector service 602, one or more storage/video intake services 606, one or more training services 608, one or more hosting service 610, one or more compute services 612, and one or more content delivery services 624 may be implemented via software, hardware, or a combination of both, and may be implemented in a distributed manner using multiple different computing devices.

A provider network 600 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 612), a storage service 606 that can store data objects, etc. The users (or "customers") of provider networks 600 may utilize one or more user accounts that are associated with a customer account, though these terms may be used somewhat interchangeably depending upon the context of use. Users may interact with a provider network 600 across one or more intermediate networks 614 (e.g., the internal via one or more interface(s), such as through use of application programming interface (API) calls, via a console 616 implemented as a website or application, etc. The interface(s) may be part of, or serve as a front-end to, a control plane of the provider network 600 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 600 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 600 by an on-demand code execution service (which may be one of compute service(s) 612) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message.

Accordingly, users can define serverless functions (e.g., as an application 640B) that can be executed on demand, without requiring the user to maintain dedicated infrastructure to execute the serverless function. Instead, the serverless functions can be executed on demand using resources maintained by the provider network 600. In some embodiments, these resources may be maintained in a "ready" state (e.g., having a pre-initialized runtime environment configured to execute the serverless functions), allowing the serverless functions to be executed in near real-time.

The mode selector service 602, in some embodiments, is a machine learning powered service that perform video encoding mode selection by one or more machine learning models 112. In some embodiments, mode selector service 602—via use of training service 608—allows users to build and use models to perform tasks for automatic encoding mode selection (e.g., on one or more input video file(s) 618 (and/or one or more (e.g., corresponding) audio file(s) 619)). In some embodiments, the mode selector service 602 (e.g., training system 620) trains and uses one or more machine learning models 112.

The training system 620, for example, may enable users to generate machine learning models 112 that infer certain encoding modes from one or more input video file(s) 618 (e.g., and/or one or more (e.g., corresponding) audio file(s) 619). In certain embodiments, the machine learning models 112 utilizes one or more components depicted in FIG. 5.

Embodiments herein allow a customer to create machine learning model(s) 112 by supplying training video file(s) 626 (e.g., including labels 628 that indicate an optimal encoding mode for certain sections (e.g., one mode for each macroblock).

At a high level, machine learning may include two major components that are required to be put in place in order to expose advertised functionality to the customer: (i) training and (ii) inference. Training may include the following responsibilities: training data analysis; data split (training, evaluating (e.g., development or validation), and testing data); model selection; model training; model evaluation; and status reporting. Inference may include the following responsibilities: model loading and hosting; and inference (e.g., synchronous and batch).

Training may include using a hyperparameter optimization (HPO) pipeline to evaluate a plurality of models and respective configurations. Training may perform a grid search over the matrix of experiments (e.g., defined upfront) in search for the model and its parameters that performs best on the given dataset.

Thus, a user 630 may provide or otherwise identify a training dataset 626 with labels 628 (e.g., media (e.g., video) file and its corresponding optimal encoder setting labels) for use in creating a model. For example, as shown at circle (1), the user 630 may utilize a client application 632 executed by a computing device 634 (e.g., a web-application implementing a console 616 for the provider network 600, a standalone application, another web-application of another entity that utilizes the mode selector service 602 as a part of its backend, a database or mixed-SQL environment, etc.) to cause the computing device 634 to upload the training dataset 626 with labels 628 to a storage location (e.g., provided by a storage service 606 such as an object storage service of a provider network 600).

Thereafter, at circle (2) the computing device 634 may issue one or more requests (e.g., API calls) to the mode selector service 602 that indicate the user's 630 desire to train a machine learning model(s) 112. The request may be of a type that identifies which type of model is to be created, e.g., CreateEncodingModeModel for creating a machine learning model(s) 112 (e.g., a hierarchy of models as in FIG. 5) that infers encoder setting(s). The request may also include one or more of an identifier of a storage location or locations storing the training dataset 626 (e.g., an identifier of just the video files, an identifier of just the labels 628, an identifier associated with both the video files and labels, etc.), which may identify a storage location (e.g., via a Uniform Resource Locator (URL), a bucket/folder identifier, etc.) within the provider network 600 (e.g., as offered by a storage service 606) or external to the provider network 600, a format identifier of the dataset 626, a language identifier of the language of the dataset 626, labels 628, etc.

Responsive to receipt of the request, the training system 620 of the mode selector service 602 is invoked and begins operations for training the corresponding type of model.

In some embodiments, the training at circle (4) of the machine learning model(s) 112 includes use (at optional, dotted circle (4)) of a separate training service 608 of mode selector service 602; similarly, the hosting system 636 may make use (at optional, dotted circle (5)) of a hosting service 610 of a mode selector service 602 to deploy a model as a hosted model 638 in association with an endpoint 640 that can receive search requests from client applications 642A and/or 642B at circle (6), provide the inference requests 644A to the associated hosted model(s) 638, and provide search results 644B (e.g., predicted encoding mode(s)) back to applications 642A and/or 642B, which may be executed by one or more computing devices 646 outside of the provider network 600 or by one or more computing devices of a compute service 612 (e.g., hardware virtualization service, serverless code execution service, etc.) within the provider network 600. In one embodiment, predicted encoding mode(s) are used by content delivery (e.g., encoding) service 624, e.g., when predictive selection of encoding mode 114 is selected.

Figure 7:
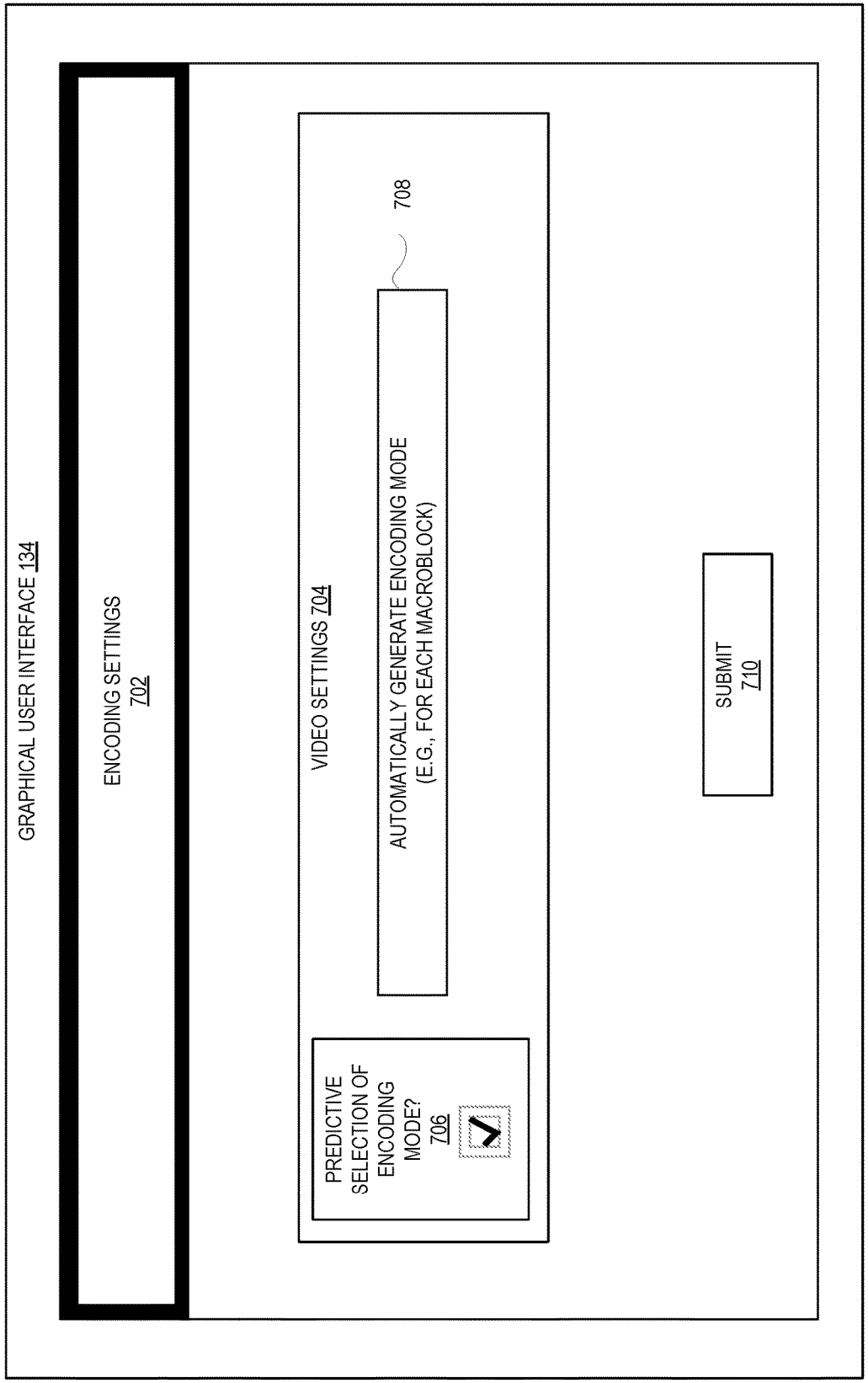
FIG. 7 is a diagram illustrating a graphical user interface for setting a content delivery system/service to predictively select one or more encoding modes according to some embodiments.

FIG. 7 is a diagram illustrating a graphical user interface 134 for setting a content delivery system/service to predictively select one or more encoding modes according to some embodiments. Depicted graphical user interface 134 includes a field 702 that is customizable with text to indicate that these are encoding settings, a field 704 that is customizable with text to indicate that these are video encoding settings, an interface element 706 that, when selected, will cause the content delivery system/service to enter "predictive selection of encoding mode 114" mode, and a field 708 that is customizable with text to indicate that selecting the interface element 706 is to cause machine learning powered generation of encoding mode(s). A user may click the submit interface element 710 to (e.g., cause a command to be sent that causes) entry of a content delivery system/service into "predictive selection of encoding mode" mode (e.g., predictive selection of encoding mode 114 in FIGS. 1, 3-5, and 6). An interface element, may include, but is not limited to, a thumbs up (or down), checkbox, button, dropdown menu, etc.

Figure 8:
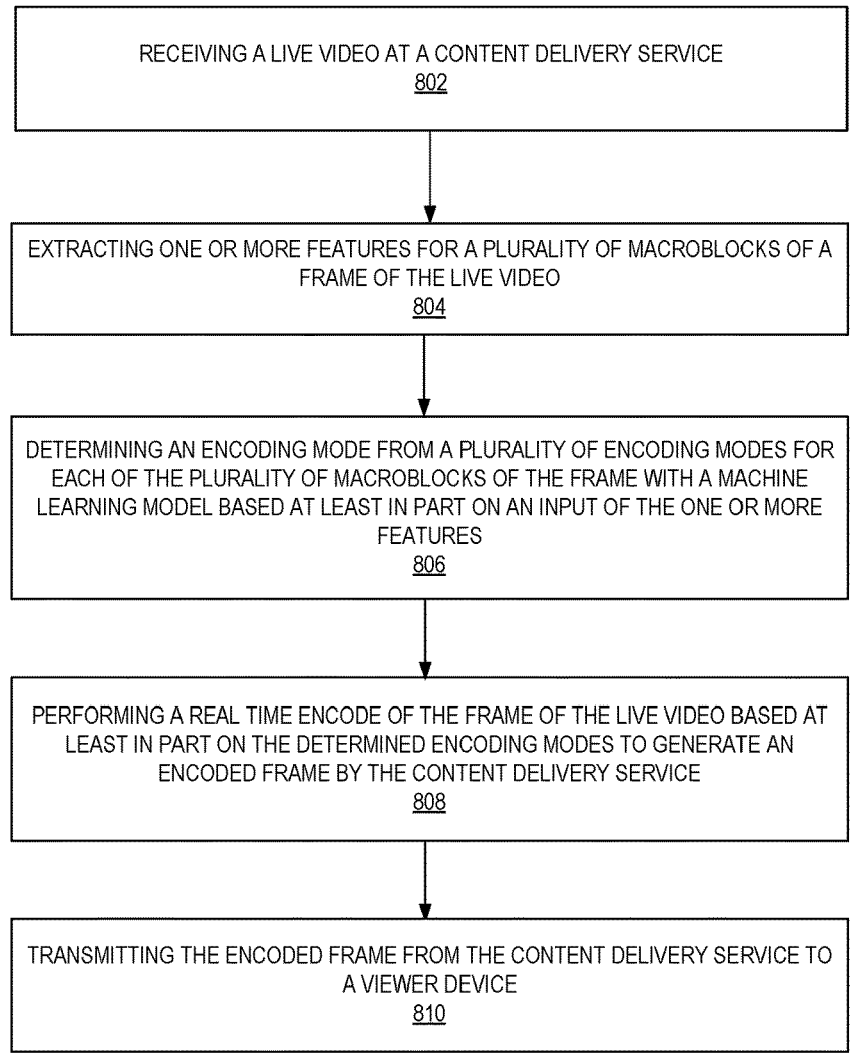
FIG. 8 is a flow diagram illustrating operations of a method for determining encoding modes for a plurality of macroblocks of a frame of a live video and using the determined encoding modes in encoding the live video according to some embodiments.

FIG. 8 is a flow diagram illustrating operations 800 of a method for determining encoding modes for a plurality of macroblocks of a frame of a live video and using the determined encoding modes in encoding the live video according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by content delivery system/service (or a component thereof) of the other figures.

The operations 800 include, at block 802, receiving a live video at a content delivery service. The operations 800 further include, at block 804, extracting one or more features for a plurality of macroblocks of a frame of the live video. The operations 800 further include, at block 806, determining an encoding mode from a plurality of encoding modes for each of the plurality of macroblocks of the frame with a machine learning model based at least in part on an input of the one or more features. The operations 800 further include, at block 808, performing a real time encode of the frame of the live video based at least in part on the determined encoding modes to generate an encoded frame by the content delivery service. The operations 800 further include, at block 810, transmitting the encoded frame from the content delivery service to a viewer device.

Figure 9:
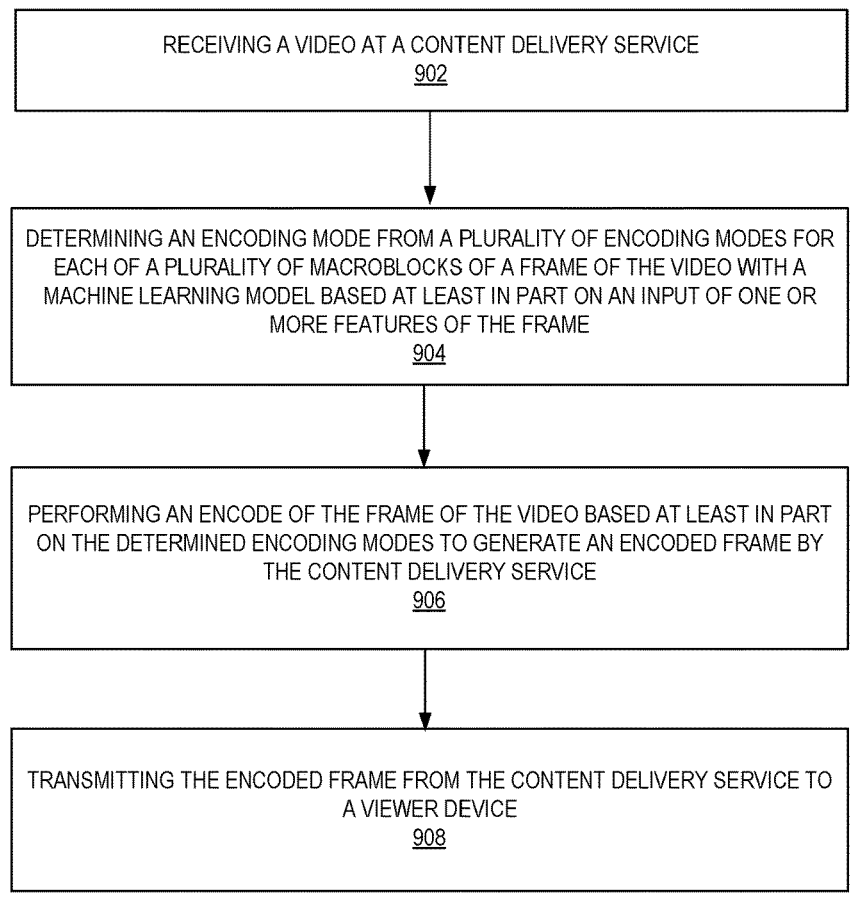
FIG. 9 is a flow diagram illustrating operations of a method for determining encoding modes for a plurality of macroblocks of a frame of a video and using the determined encoding modes in encoding the video according to some embodiments.

FIG. 9 is a flow diagram illustrating operations 900 of a method for determining encoding modes for a plurality of macroblocks of a frame of a video and using the determined encoding modes in encoding the video according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 900 are performed by content delivery system/service (or a component thereof) of the other figures.

The operations 900 include, at block 902, receiving a video at a content delivery service. The operations 900 further include, at block 904, determining an encoding mode from a plurality of encoding modes for each of a plurality of macroblocks of a frame of the video with a machine learning model based at least in part on an input of one or more features of the frame. The operations 900 further include, at block 906, performing an encode of the frame of the video based at least in part on the determined encoding modes to generate an encoded frame by the content delivery service. The operations 900 further include, at block 908, transmitting the encoded frame from the content delivery service to a viewer device.

Exemplary environments, systems, etc. that the above may be used in are detailed below.

Figure 10:
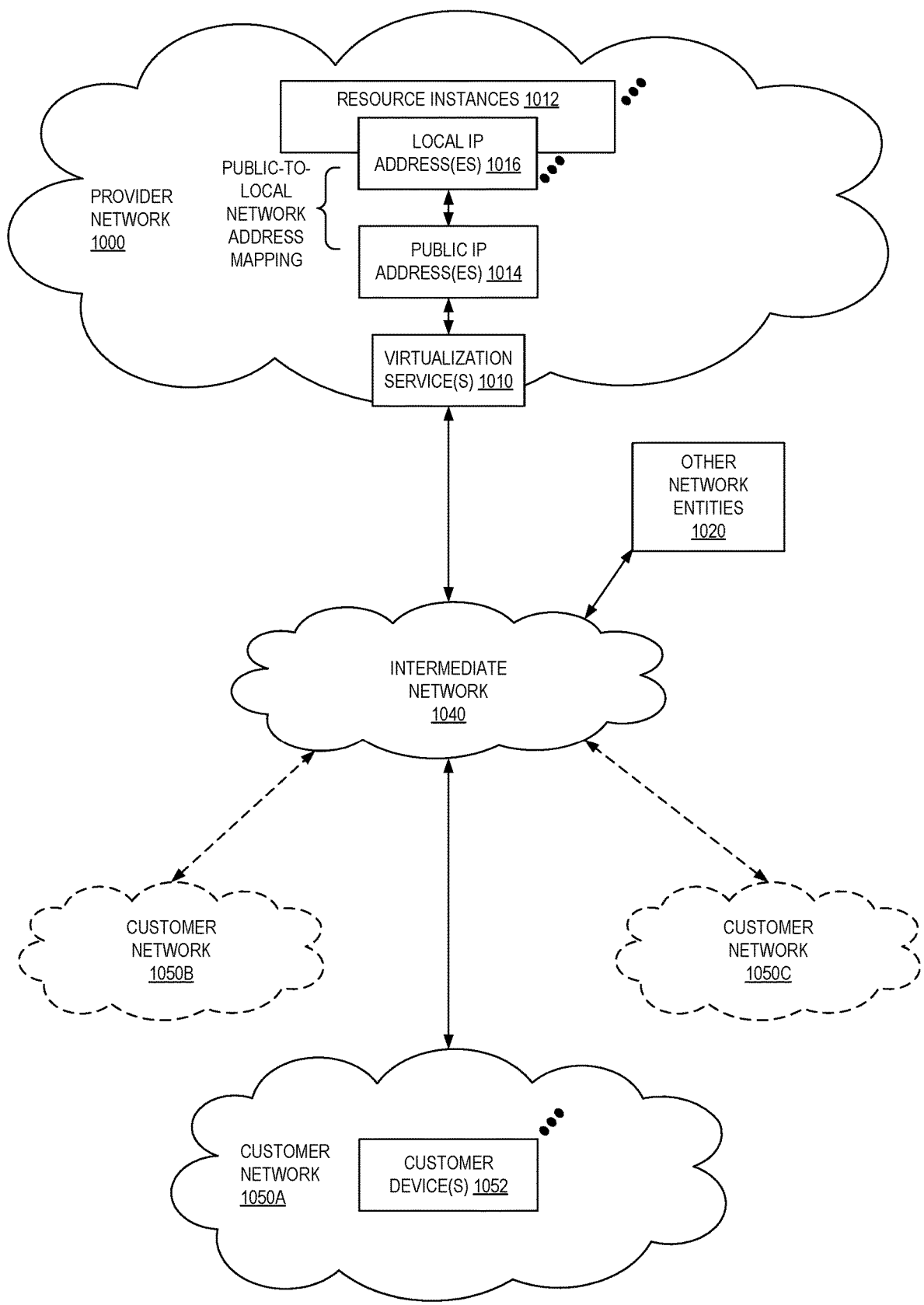
FIG. 10 illustrates an example provider network environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
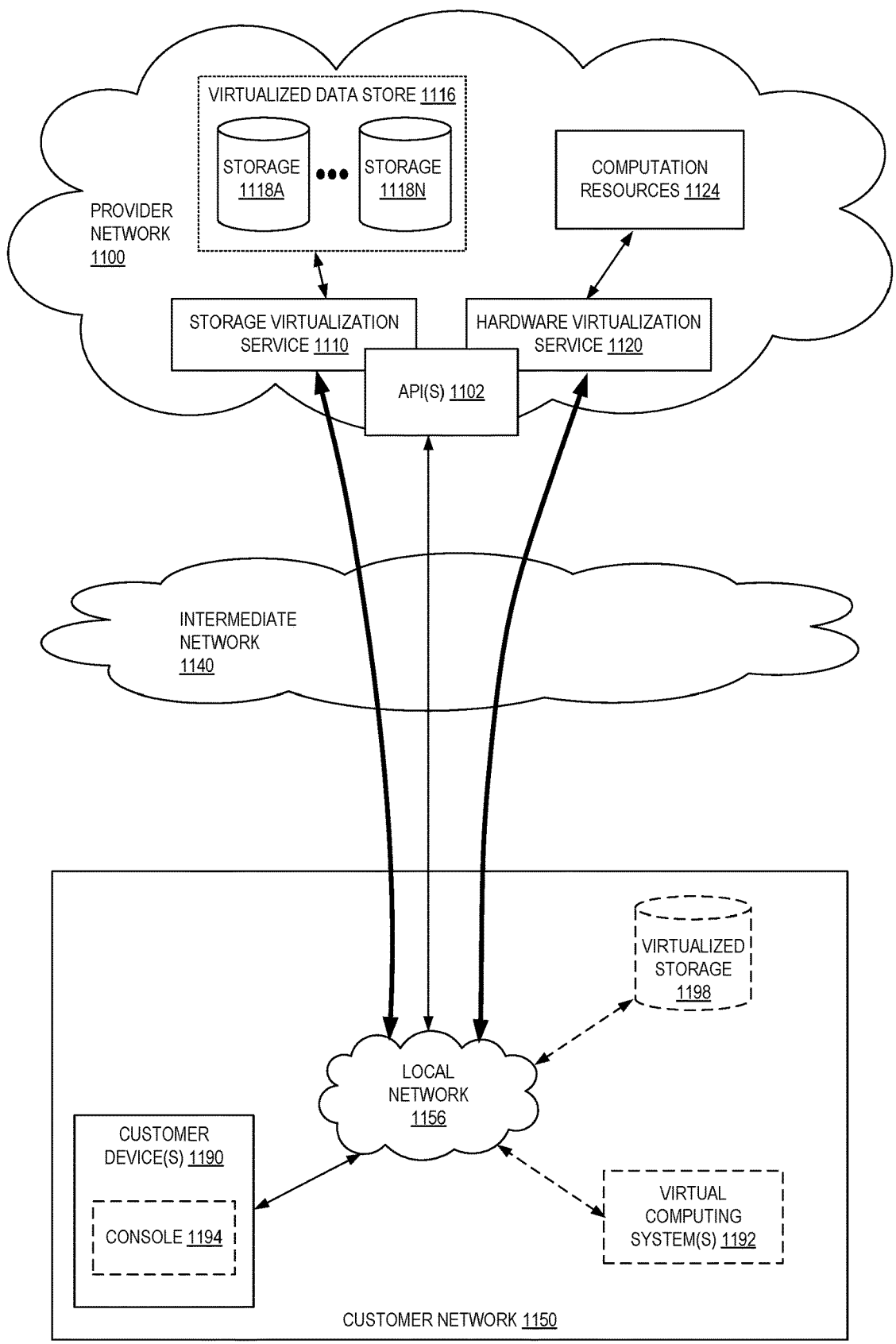
FIG. 11 is a block diagram of an example provider network that provides a storage service and a hardware virtualization service to customers according to some embodiments.

FIG. 11 is a block diagram of an example provider network that provides a storage service and a hardware virtualization service to customers, according to some embodiments. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some embodiments, a virtualized data store gateway (not shown) may be provided at the customer network 1150 that may locally cache at least some data, for example frequently-accessed or critical data, and that may communicate with storage service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
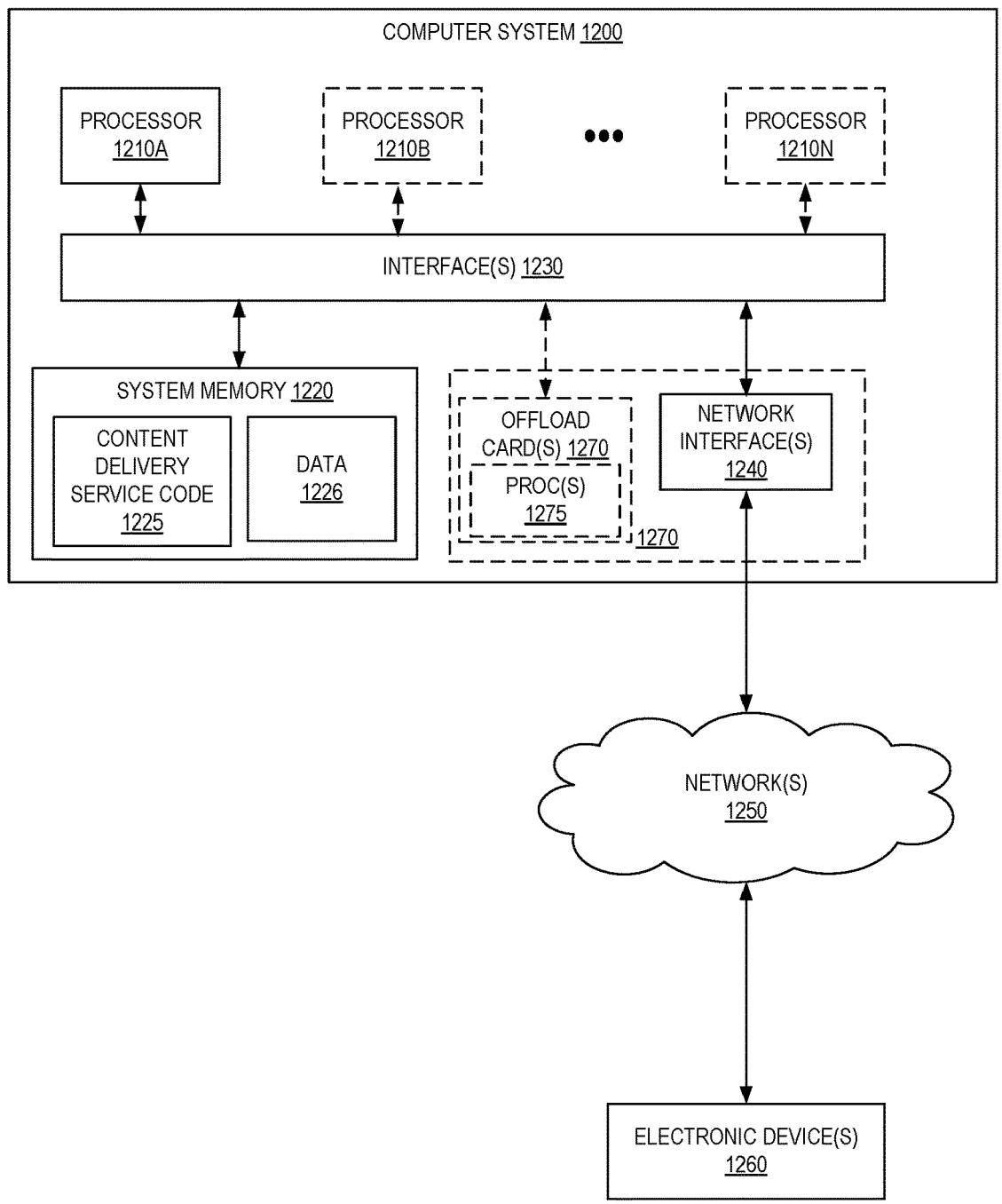
FIG. 12 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as content delivery service code 1225 (e.g., executable to implement, in whole or in part, the content delivery service 624) and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Figure 13:
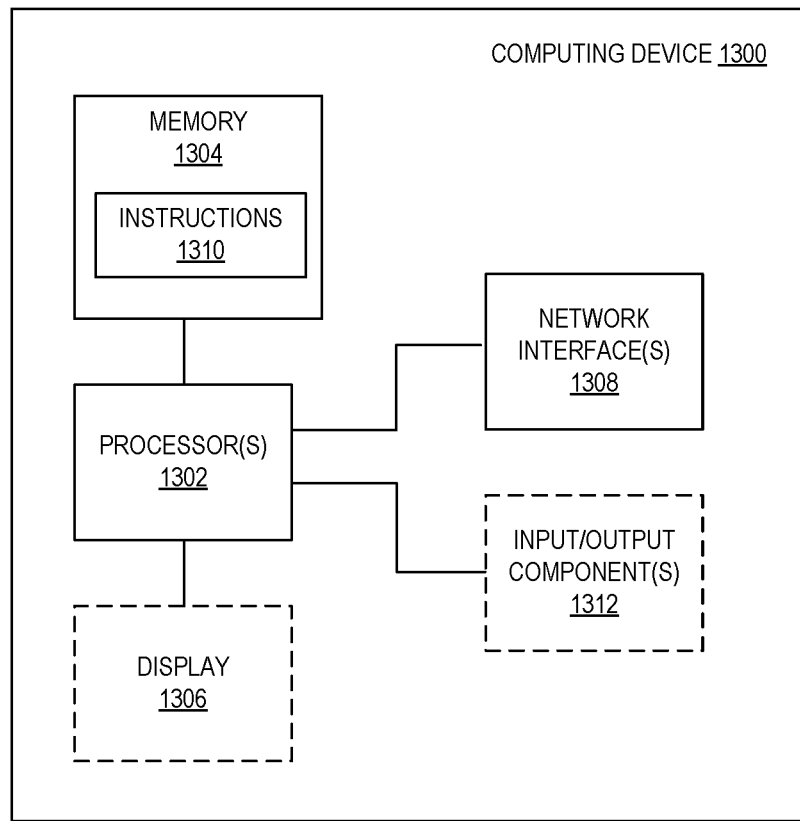
FIG. 13 illustrates a logical arrangement of a set of general components of an exemplary computing device that can be utilized in accordance with various embodiments.

FIG. 13 illustrates a logical arrangement of a set of general components of an example computing device 1300. Generally, a computing device 1300 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1302 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1304) to store code (for example, instructions 1310, e.g., which implement a content delivery service as disclosed herein), and a set of one or more wired or wireless network interfaces 1308 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1304) of a given electronic device typically stores code (e.g., instructions 1310) for execution on the set of one or more processors 1302 of that electronic device. One or more parts of various embodiments may be implemented using different combinations of software, firmware, and/or hardware.

A computing device 1300 can include some type of display element 1306, such as a touch screen or liquid crystal display (LCD), although many devices such as portable media players might convey information via other means, such as through audio speakers, and other types of devices such as server end stations may not have a display element 1306 at all. As discussed, some computing devices used in some embodiments include at least one input and/or output component(s) 1312 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 14:
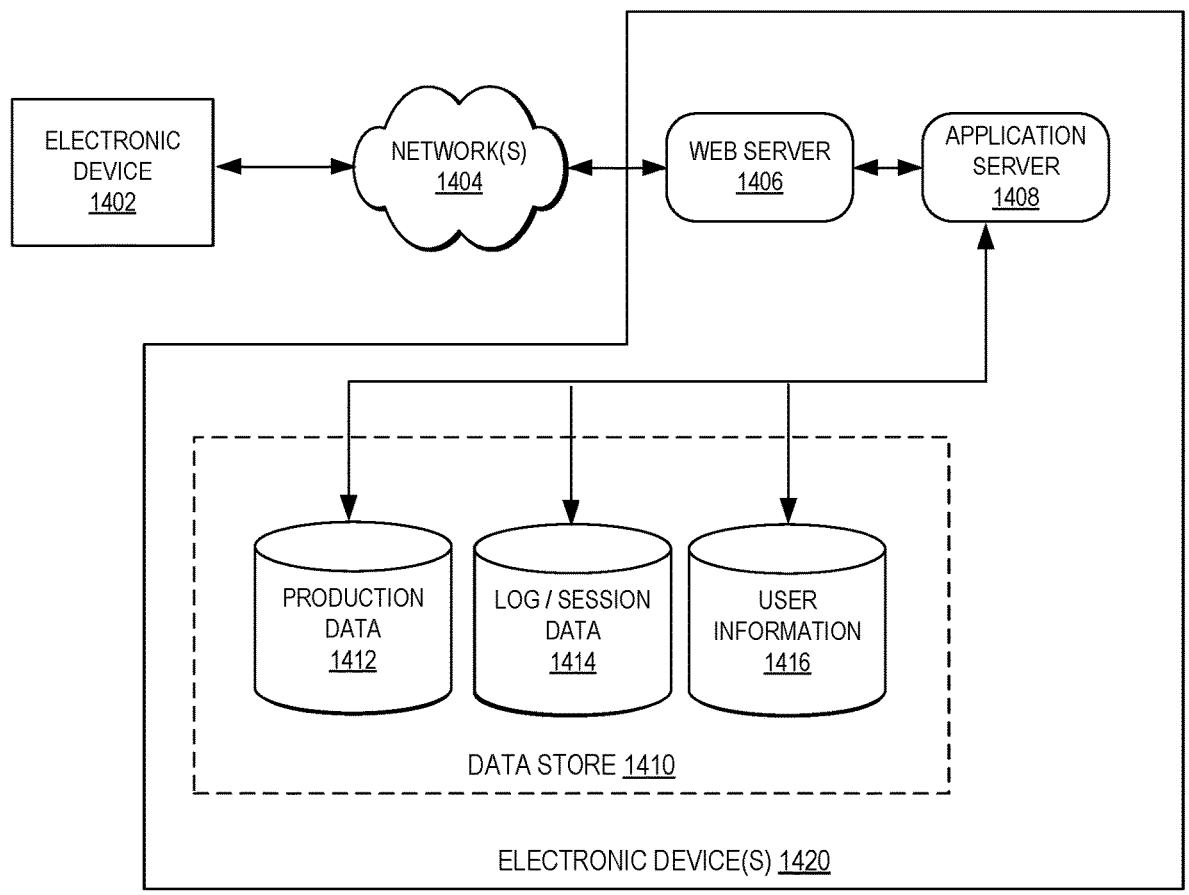
FIG. 14 illustrates an example of an environment for implementing aspects in accordance with various embodiments.

As discussed, different approaches can be implemented in various environments in accordance with the described embodiments. For example, FIG. 14 illustrates an example of an environment 1400 for implementing aspects in accordance with various embodiments. For example, in some embodiments messages are HyperText Transfer Protocol (HTTP) requests that are received by a web server (e.g., web server 1406), and the users, via electronic devices, may interact with the provider network via a web portal provided via the web server 1406 and application server 1408. As will be appreciated, although a web-based environment is used for purposes of explanation, different environments may be used, as appropriate, to implement various embodiments. The system includes an electronic client device 1402, which may also be referred to as a client device and can be any appropriate device operable to send and receive requests, messages or information over an appropriate network 1404 and convey information back to a user of the device 1402. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1404 includes the Internet, as the environment includes a web server 1406 for receiving requests and serving content in response thereto, although for other networks an alternative device serving a similar purpose could be used, as would be apparent to one of ordinary skill in the art.

The illustrative environment includes at least one application server 1408 and a data store 1410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device 1402 and handling a majority of the data access and business logic for an application. The application server 1408 provides access control services in cooperation with the data store 1410 and is able to generate content such as text, graphics, audio, video, etc., to be transferred to the client device 1402, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1402 and the application server 1408, can be handled by the web server 1406. It should be understood that the web server 1406 and application server 1408 are not required and are merely example components, as structured code discussed herein can be executed on any appropriate device or host machine as discussed elsewhere herein.

The data store 1410 can include several separate data tables, databases, or other data storage mechanisms and media for storing data relating to a particular aspect. For example, the data store illustrated includes mechanisms for storing production data 1412 and user information 1416, which can be used to serve content for the production side. The data store 1410 also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update, or otherwise process data in response thereto. In one example, a user might submit a search request for a certain type of item. In this case, the data store 1410 might access the user information 1416 to verify the identity of the user and can access a production data 1412 to obtain information about items of that type. The information can then be returned to the user, such as in a listing of results on a web page that the user is able to view via a browser on the user device 1402. Information for a particular item of interest can be viewed in a dedicated page or window of the browser.

The web server 1406, application server 1408, and/or data store 1410 may be implemented by one or more electronic devices 1420, which can also be referred to as electronic server devices or server end stations, and may or may not be located in different geographic locations. Each of the one or more electronic devices 1420 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1118A-1118N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a live video at a content delivery service;
   extracting one or more features for a plurality of macroblocks of a frame of the live video;
   determining an encoding mode from a plurality of encoding modes for each of the plurality of macroblocks of the frame with a machine learning model based at least in part on an input of the one or more features and one or more reference frames of the live video;
   performing a real time encode of the frame of the live video based at least in part on the determined encoding modes to generate an encoded frame by the content delivery service; and
   transmitting the encoded frame from the content delivery service to a viewer device.

2. The computer-implemented method of claim 1, wherein the determining comprises determining the encoding mode from the plurality of encoding modes for each of the plurality of macroblocks of the frame with the machine learning model of a hierarchy of machine learning models based at least in part on the input of the one or more features.

3. A computer-implemented method comprising:
   receiving a video at a content delivery service;
   determining an encoding mode from a plurality of encoding modes for each of a plurality of macroblocks of a frame of the video with a machine learning model based at least in part on an input of one or more features of the frame;
   performing an encode of the frame of the video based at least in part on the determined encoding modes to generate an encoded frame by the content delivery service; and
   transmitting the encoded frame from the content delivery service to a viewer device, wherein when the video is a live video, the performing the encode of the frame comprises performing a real time single encode of the frame of the live video based at least in part on the determined encoding modes between receipt of the live video at the content delivery service and the transmitting the encoded frame.

4. The computer-implemented method of claim 3, wherein the determining comprises determining the encoding mode from the plurality of encoding modes for each of the plurality of macroblocks of the frame with the machine learning model based at least in part on an input of the one or more features and one or more reference frames of the video.

5. The computer-implemented method of claim 3, wherein the determining comprises determining the encoding mode from the plurality of encoding modes for each of the plurality of macroblocks of the frame of the video with the machine learning model based at least in part on an input of the one or more features of the frame and an encoding mode of one or more adjacent macroblocks of the frame.

6. The computer-implemented method of claim 3, wherein the real time single encode is a single-pass encode.

7. The computer-implemented method of claim 3, wherein the encoding mode is a direct encoding mode.

8. The computer-implemented method of claim 3, wherein the encoding mode is an inter frame encoding mode.

9. The computer-implemented method of claim 3, wherein the encoding mode is an intra frame encoding mode.

10. The computer-implemented method of claim 3, wherein the determining comprises determining the encoding mode from the plurality of encoding modes for each of the plurality of macroblocks of the frame of the video with the machine learning model of a hierarchy of machine learning models based at least in part on the input of the one or more features of the frame.

11. The computer-implemented method of claim 10, wherein the machine learning model is at a first level of the hierarchy of machine learning models that outputs the encoding mode for a macroblock of the plurality of macroblocks, and other levels of the hierarchy of machine learning models are skipped when the encoding mode that is output from the first level exceeds an accuracy threshold.

12. The computer-implemented method of claim 3, further comprising performing iterative trial and error operations to select an encoding mode for a macroblock of the video in response to a number of macroblocks, having their encoding mode determined by the machine learning model, exceeding a threshold.

13. A system comprising:
    a video intake service implemented by a one or more electronic devices, the video intake service including instructions that upon execution cause the one or more electronic devices to intake a video; and
    a content delivery service implemented by a one or more electronic devices, the content delivery service including instructions that upon execution cause the one or more electronic devices to perform operations comprising:
       determining an encoding mode from a plurality of encoding modes for each of a plurality of macroblocks of a frame of the video with a machine learning model based at least in part on an input of one or more features of the frame,
       performing an encode of the frame of the video based at least in part on the determined encoding modes to generate an encoded frame by the content delivery service, and
       transmitting the encoded frame from the content delivery service to a viewer device, wherein when the video is a live video, the performing the encode of the frame comprises performing a real time single encode of the frame of the live video based at least in part on the determined encoding modes between receipt of the live video at the content delivery service and the transmitting the encoded frame.

14. The system of claim 13, wherein the instructions upon execution cause the content delivery service to perform operations wherein the determining comprises determining the encoding mode from the plurality of encoding modes for each of the plurality of macroblocks of the frame with the machine learning model based at least in part on an input of the one or more features and one or more reference frames of the video.

15. The system of claim 13, wherein the instructions upon execution cause the content delivery service to perform operations wherein the determining comprises determining the encoding mode from the plurality of encoding modes for each of the plurality of macroblocks of the frame of the video with the machine learning model of a hierarchy of machine learning models based at least in part on the input of the one or more features of the frame.

16. The system of claim 15, wherein the instructions upon execution cause the content delivery service to perform operations wherein the machine learning model is at a first level of the hierarchy of machine learning models that outputs the encoding mode for a macroblock of the plurality of macroblocks, and other levels of the hierarchy of machine learning models are skipped when the encoding mode that is output from the first level exceeds an accuracy threshold.

17. The system of claim 13, wherein the instructions upon execution cause the content delivery service to perform operations further comprising performing iterative trial and error operations to select an encoding mode for a macroblock of the video in response to a number of macroblocks, having their encoding mode determined by the machine learning model, exceeding a threshold.

18. A computer-implemented method comprising:
receiving a video at a content delivery service;
determining an encoding mode from a plurality of encoding modes for each of a plurality of macroblocks of a frame of the video with a machine learning model based at least in part on an input of one or more features of the frame;
performing an encode of the frame of the video based at least in part on the determined encoding modes to generate an encoded frame by the content delivery service; and
transmitting the encoded frame from the content delivery service to a viewer device, wherein the determining comprises determining the encoding mode from the plurality of encoding modes for each of the plurality of macroblocks of the frame of the video with the machine learning model of a hierarchy of machine learning models based at least in part on the input of the one or more features of the frame, the machine learning model is at a first level of the hierarchy of machine learning models that outputs the encoding mode for a macroblock of the plurality of macroblocks, and other levels of the hierarchy of machine learning models are skipped when the encoding mode that is output from the first level exceeds an accuracy threshold.

19. The computer-implemented method of claim 18, further comprising performing iterative trial and error operations to select an encoding mode for a macroblock of the video in response to a number of macroblocks, having their encoding mode determined by the machine learning model, exceeding a threshold.

20. A computer-implemented method comprising:
receiving a video at a content delivery service;
determining an encoding mode from a plurality of encoding modes for each of a plurality of macroblocks of a frame of the video with a machine learning model based at least in part on an input of one or more features of the frame;
performing an encode of the frame of the video based at least in part on the determined encoding modes to generate an encoded frame by the content delivery service;
transmitting the encoded frame from the content delivery service to a viewer device; and
performing iterative trial and error operations to select an encoding mode for a macroblock of the video in response to a number of macroblocks, having their encoding mode determined by the machine learning model, exceeding a threshold.

21. The computer-implemented method of claim 20, wherein the determining comprises determining the encoding mode from the plurality of encoding modes for each of the plurality of macroblocks of the frame of the video with the machine learning model of a hierarchy of machine learning models based at least in part on the input of the one or more features of the frame, the machine learning model is at a first level of the hierarchy of machine learning models that outputs the encoding mode for a macroblock of the plurality of macroblocks, and other levels of the hierarchy of machine learning models are skipped when the encoding mode that is output from the first level exceeds an accuracy threshold.

* * * * *